(12) United States Patent
Watanabe et al.

(10) Patent No.: US 7,423,403 B2
(45) Date of Patent: Sep. 9, 2008

(54) MOTOR CONTROL SYSTEM

(75) Inventors: Mitsuhiko Watanabe, Odawara (JP);
Katsuya Oyama, Hitachinaka (JP);
Shoji Sasaki, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/471,660

(22) Filed: Jun. 21, 2006

(65) Prior Publication Data
US 2007/0002505 A1    Jan. 4, 2007

(30) Foreign Application Priority Data
Jun. 22, 2005    (JP) .............................. 2005-181430

(51) Int. Cl.
*G05D 23/275*    (2006.01)
(52) U.S. Cl. ..................... 318/632; 318/599; 318/635; 318/678
(58) Field of Classification Search ................. 318/632, 318/568.22, 599, 635, 677, 678, 798; 327/87, 327/67; 330/259, 11; 388/871, 910
See application file for complete search history.

(56) References Cited
U.S. PATENT DOCUMENTS
5,600,275 A * 2/1997 Garavan ..................... 327/307
6,304,144 B1 * 10/2001 Yamazaki et al. ........... 330/259
6,429,697 B1 * 8/2002 Amazeen et al. ............. 327/87

FOREIGN PATENT DOCUMENTS
JP    2004-117070 A    4/2004

* cited by examiner

*Primary Examiner*—Karen Masih
(74) *Attorney, Agent, or Firm*—Crowell & Moring LLP

(57) ABSTRACT

A motor control system which can realize current detection with high accuracy by using an amplifier having an ordinary level of accuracy and can avoid deterioration of current detection accuracy even when emperature is changed. The motor control system comprises a switch circuit for supplying a driving current to a motor, a resistor for detecting the driving current, an amplification circuit for amplifying a potential difference across the resistor, an input section switch unit disposed in an input section of the amplification circuit and changing over the potential difference to be forward biased or reverse biased, an output section switch unit disposed in an output section of the amplification circuit and changing over an output voltage of the amplification circuit to be forward biased or reverse biased, and a CPU for averaging a voltage produced when the output voltage of the amplification circuit is forward biased, and a voltage produced when the output voltage of the amplification circuit is reverse biased.

15 Claims, 18 Drawing Sheets

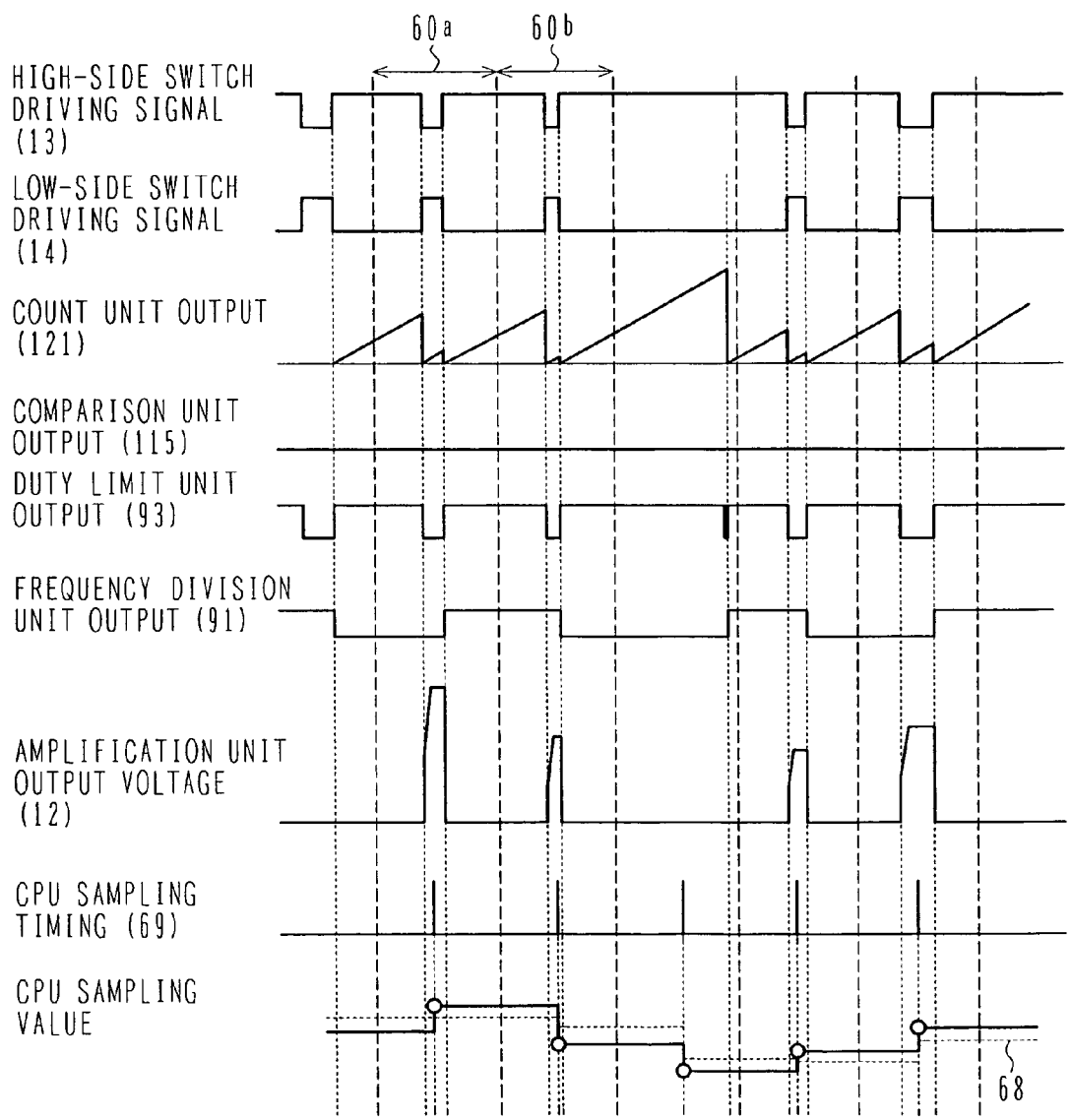

ical amplifier has fewer options, other conditions, such as a
temperature condition, cannot be satisfied in some cases.

MOTOR CONTROL SYSTEM

BACKGROUND OF THE INVENTION

1. Field of the Invention

The present invention relates to a motor control system, and more particularly to a motor control system for a three-phase brushless DC motor which is used, for example, as an assisting motor in an electric power steering system.

2. Description of the Related Art

Recently, a technique for assisting torque by using a motor instead of a conventional hydraulic power assisting system has been brought into practice for the purpose of reducing the vehicle weight and improving fuel economy.

For example, a three-phase brushless DC motor, which is a comparatively quick-responsive, can produce high torque, and is easy to control, is used as an assisting motor in an electric power steering (EPS) system. In the three-phase brushless DC motor, the produced torque is changed in proportion to a current. To accurately control the three-phase brushless DC motor, therefore, the current flowing through the motor requires to be detected with accuracy.

To that end, a method disclosed in, e.g., Patent Document 1 (JP-A-2004-117070) has been employed in the past. According to the disclosed method, a current sensing resistor (shunt resistor) is externally added, and a potential difference generated by a motor driving current across the current sensing resistor is amplified by an amplification circuit, e.g., an operational amplifier, and is taken into a microcomputer through the A/D conversion function. By using the taken-in data, current value feedback control is performed so that the current flowing through the current sensing resistor is matched with a target current. The motor is thus driven in accordance with PWM control.

SUMMARY OF THE INVENTION

However, an amplification circuit, e.g., an operational amplifier, usually has an input offset (voltage). In a generally employed operational amplifier, the input offset is about 10 mV at maximum. The input offset includes a variation depending on temperature. It is hence required to take into consideration an offset error of about 10 mV at maximum when temperature varies.

On the other hand, when the motor for use in the electric power steering is controlled, a current in excess of 100 A at maximum has to be controlled. In such a case, it is required to use, as the current sensing resistor, a resistor of about 1 mΩ in consideration of heating, etc.

If detection accuracy deteriorates, a driver operating a steering wheel may be given with an unusual feeling. For that reason, the current detection accuracy requires to be held within ± several %. When the input offset of about ±10 mA is generated, such an amount of the input offset corresponds to an error of 10 A in the case of using the current sensing resistor of 1 mΩ. In other words, the control current of 100 A includes an error of about 10%, thus possibly causing the problem of a torque ripple, for example. Particularly, when a small current flows, an influence of the offset error upon the control current is increased and the possibility of causing the problem becomes more significant.

Using an operational amplifier having a smaller input offset is conceivable to increase the accuracy, but this solution leads to an increase of the cost. Also, because such an operational amplifier has fewer options, other conditions, such as a temperature condition, cannot be satisfied in some cases.

Further, the above-described problem depends on the input offset inevitably caused in an amplification circuit, and therefore it cannot be solved by increasing, e.g., A/D conversion accuracy of a CPU.

Another problem is that, even if an initial error due to the input offset is compensated by initial calibration, that calibration is not adaptable for the offset error depending on temperature.

With intent to hold down the cost, a current driving circuit, a current sensing circuit, etc. have recently been integrated into an IC chip. In such a case, the performance of a circuit including an operational amplifier, etc. depends on characteristics of devices and processes used when the IC chip is manufactured. This results in a possibility that an operational amplifier having high accuracy cannot be realized, or that the cost is increased due to the increased chip size.

One object of the present invention is to provide a motor control system which can avoid deterioration of accuracy due to an offset error even when an amplification circuit, e.g., an operational amplifier, having an ordinary input offset is used.

Another object of the present invention is to provide a motor control system which is not affected by any characteristics of devices and processes even when a current sensing circuit is manufactured in the form of an IC chip.

To achieve the above objects, a motor control system according to one aspect of the present invention comprises a switch circuit for supplying a driving current to a motor; a current sensing circuit for detecting the driving current and converting the detected current to a voltage; and an amplification circuit for amplifying the voltage converted by the current sensing circuit, wherein the motor control system further comprises a unit for compensating an input offset of the amplification circuit.

A motor control system according to another aspect of the present invention comprises a switch circuit including a high-side switch and a low-side switch and supplying a driving current to a three-phase motor; a resistor for detecting the driving current; an amplification circuit for amplifying a potential difference across said resistor; an input section switch unit disposed in an input section of the amplification circuit and changing over the potential difference to be forward biased or reverse biased; an output section switch unit disposed in an output section of the amplification circuit and changing over an output voltage of the amplification circuit to be forward biased or reverse biased; and a processing unit for averaging a first output voltage produced when the output voltage of the amplification circuit is forward biased, and a second output voltage produced when the output voltage of the amplification circuit is reverse biased.

According to the present invention, the motor control system having a low cost and high accuracy can be obtained.

BRIEF DESCRIPTION OF THE DRAWINGS

FIG. 18 is a timing chart for explaining the operation of the fifth embodiment.

DESCRIPTION OF THE PREFERRED EMBODIMENTS

Embodiments of the present invention will be described below in detail with reference to FIGS. 1-18.

First Embodiment

Figure 1:
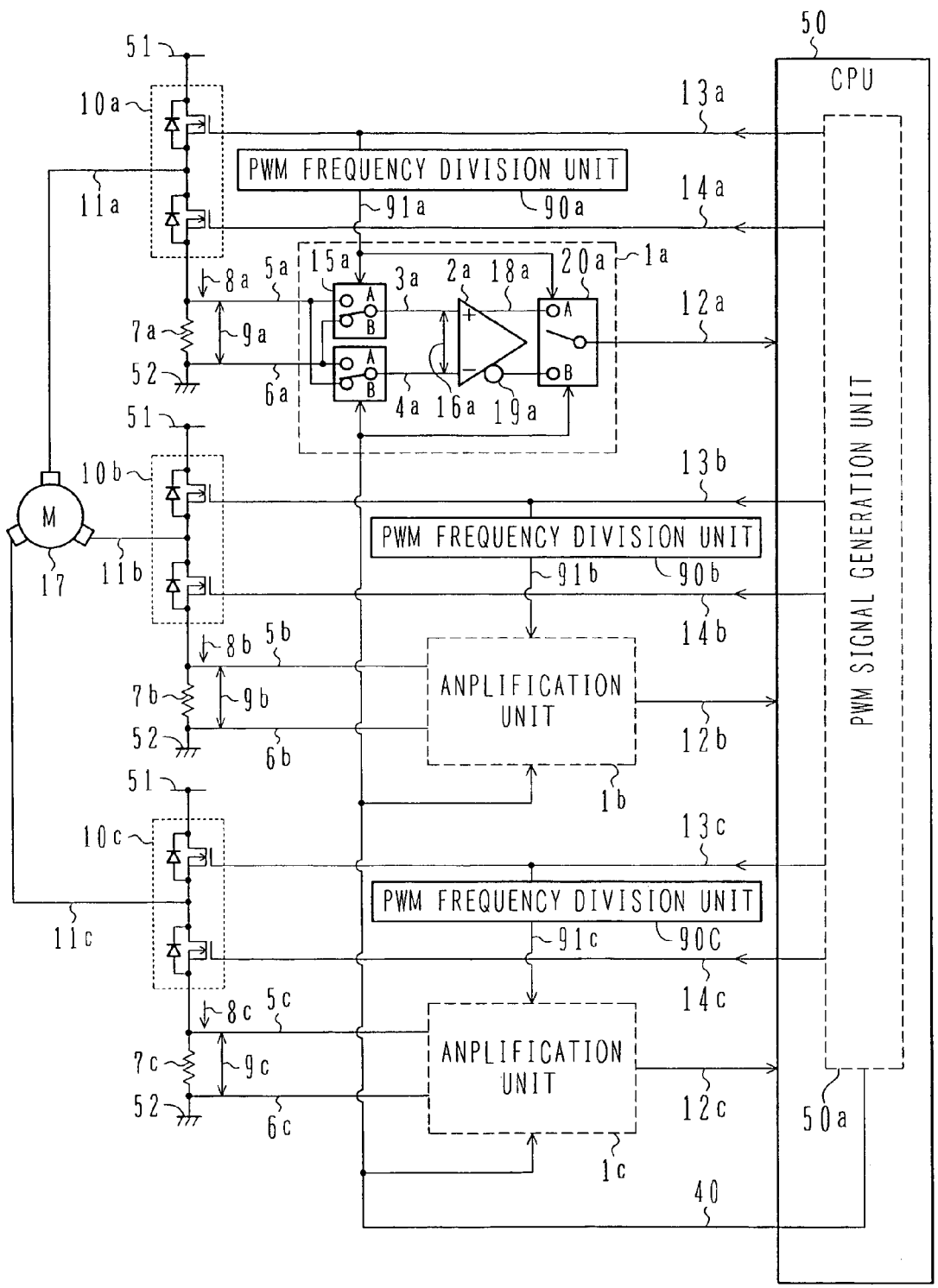
FIG. 1 is a circuit block diagram for explaining a first embodiment of the present invention.

FIG. 1 is a circuit block diagram showing a motor driving-current sensing circuit according to a first embodiment of the present invention.

Referring to FIG. 1, reference numeral 1 (typically representing 1a, 1b and 1c for each of three phases) denotes an amplification unit for amplifying a voltage difference 9 across a current sensing resistor (shunt resistor) 7. The amplification unit 1 comprises an amplification circuit 2 for amplifying the difference between two positive (+) and negative (−) inputs, the amplification circuit 2 receiving a positive (+)-side input signal 3 and a negative (−)-side input signal 4 and outputting a positive gain output 18 and a negative gain output 19, an input switch unit 15 for alternately switching over connection between current sensing resistor terminal voltages 5, 6 and the positive (+)- and negative (−)-side input signals 3, 4 of the amplification circuit 2, and an output switch unit 20 for alternately switching over the two outputs, i.e., the positive gain output 18 and the negative gain output 19. Reference numeral 16 denotes an input offset voltage Vofs of the amplification circuit 2.

Reference numeral 7 denotes the current sensing resistor for detecting a driving current 8 supplied to drive a motor 17. Reference numerals 5 and 6 denote the voltages at opposite terminals of the current sensing resistor 7, and 9 denotes the potential difference between the two voltages. Reference numeral 10 denotes a driving switch circuit made up of MOS transistors, etc. and supplying a current to the motor 17 to drive it. The driving switch circuit is subjected to ON/OFF switching control in accordance with a PWM control signal from a CPU 50, for example. Reference numeral 11 denotes a motor driving signal, and 12 denotes an amplified output signal (voltage) from the amplification unit 1. Reference numeral 13 denotes a high-side switch driving signal for performing ON/OFF control of the driving switch circuit 10, and 14 denotes a low-side switch driving signal. Reference numeral 17 denotes a three-phase motor which is actually driven by a motor control system of the first embodiment.

Reference numeral 40 denotes an amplification unit switching signal outputted from the CPU 50 in sync with a PWM cycle. The input switch unit 15 and the output switch unit 20 in the amplification unit 1 are each changed over in accordance with the amplification unit switching signal. Reference numeral 50 denotes the CPU which generates the high-side switch driving signal 13, the low-side switch driving signal 14, and the amplification unit switching signal 40. These signals 13, 14 and 40 are outputted from a PWM signal generation unit 50a of the CPU 50.

Reference numeral 90 denotes a PWM frequency division unit for dividing the frequency of the high-side switch driving signal 13. An output signal of the PWM frequency division unit 90, i.e., a PWM frequency divided signal 91, is inputted to the amplification unit 1. The input switch unit 15 and the output switch unit 20 are each changed over in accordance with the PWM frequency divided signal 91. Reference numeral 51 denotes a power supply and 52 denotes GND (ground).

Note that, in the drawings showing the embodiment, a, b and c suffixed to the reference numerals indicate equivalent circuit components and units in the current sensing circuit for detecting currents in U, V and W phases, respectively, which are supplied to drive the three-phase motor 17.

The operation of this first embodiment will be described below with reference to FIGS. 2 and 3.

Figure 2:
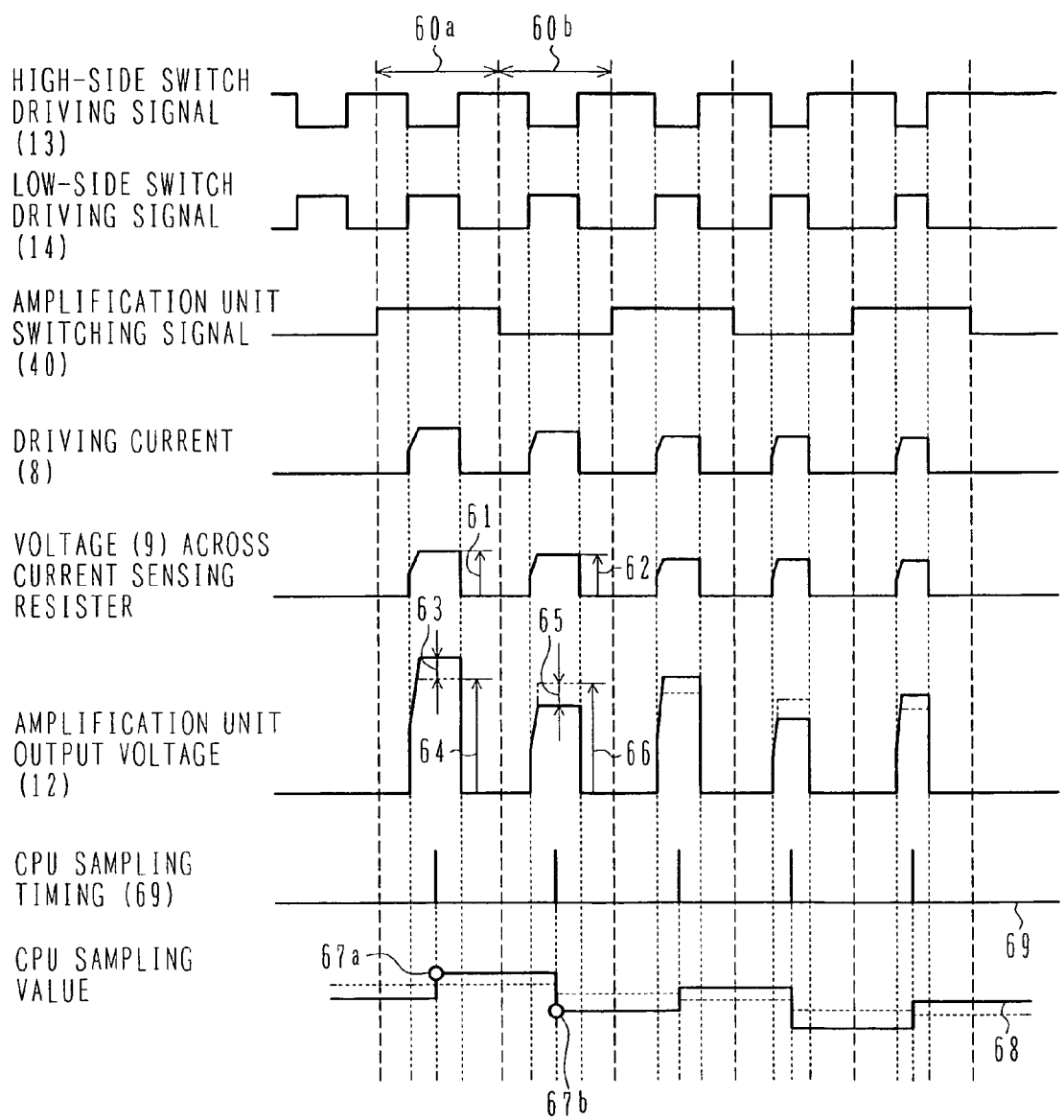
FIG. 2 is a timing chart for explaining the operation of the first embodiment.

FIG. 2 is a timing chart for explaining the operation of the first embodiment shown in FIG. 1. Referring to FIG. 2, reference numeral 60 (including 60a and 60b) denotes a PWM cycle in driving of the motor 17. A high/low level of the amplification unit switching signal 40 is changed over at timing in sync with the PWM cycle. Reference numerals 61 and 62 denote voltages generated respectively at the opposite terminals of the current sensing resistor (shunt resistor). Each of reference numerals 63 and 65 denotes a value obtained by multiplying the input offset voltage 16 of the amplification unit 1 by a predetermined gain value of the amplification circuit 2, and 64 and 66 denotes values obtained respectively by multiplying the voltages 61 and 62 at the opposite terminals of the current sensing resistor by the predetermined gain value of the amplification circuit 2.

Reference numeral 69 denotes a sampling timing signal which indicates A/D-conversion timing of the CPU 50. Sampling of the amplification unit output signal 12 is performed at the timing of the sampling timing signal 69. Reference numeral 67 (including 67a and 67b) denotes a sampling value obtained by sampling the amplification unit output signal (voltage) 12 at the timing of the sampling timing signal 69, and 68 denotes an average value of the sampling values 67.

The operation of the first embodiment is as follows.

In the circuit arrangement shown in FIG. 1, the CPU 50 outputs the high-side switch driving signal 13 and the low-side switch driving signal 14 in sync with the PWM cycle 60. The driving switch circuit 10 is turned on/off in accordance with the signals 13 and 14, whereby driving currents are supplied, as the motor driving signals 11a, 11b and 11c in U, V and W phases, to the three-phase motor 17 which is connected to the driving switch circuit 10. When the high-side switch driving signal 13 is high, the driving current flows from the power supply 51 to the motor 17, and when the low-side switch driving signal 14 is high, the driving current flows from the motor 17 to the GND 52.

In the first embodiment, because the current sensing resistor 7 is added to the downstream side of a low-side switch of the driving switch circuit 10, the driving current 8 flows to the current sensing resistor only during a period in which the low-side switch is turned on, as shown in FIG. 2, thereby generating the potential difference 9 across the current sensing resistor. Reference numerals 61 and 62 in FIG. 2 denote voltage levels generated at the opposite terminals of the current sensing resistor in the cycles 60a and 60b, respectively, and the potential difference 9 between those voltage levels is given as a value obtained by performing a multiplication of (current sensing resistor value×current amount).

The voltages 5 and 6 at the opposite terminals of the current sensing resistor 7 are inputted to the amplification unit 1, and current detection is performed through the following operation. First, in the period 60a, because the amplification unit switching signal 40 is high, the input switch unit 15 and the output switch unit 20 are both changed over to the (A) side (this will be referred to as the "forward biased side"). In this state, the current sensing resistor terminal voltages 5 and 6 are provided as the positive (+)-side input signal 3 and the negative (−)-side input signal 4 and are introduced to positive (+) and negative (−) input terminals of the amplification circuit 2, respectively. The amplification circuit 2 multiplies the input signals by the predetermined gain and outputs the positive gain output 18 (gain: GA) and the negative gain output 19 (gain: −GA). Because the output switch unit 20 is also changed over to the (A) side, the positive gain output 18 is outputted as the amplification unit output voltage 12 and is inputted to the CPU 50. At this time, on an assumption that the current sensing resistor terminal voltage is expressed by 61 and the input offset voltage 16 of the amplification circuit 2 is given by +Vofs, the voltage inputted to the amplification circuit 2 is expressed by (61+Vofs). Accordingly, the positive gain output 18 of the amplification circuit 2 is given by (61+Vofs)×GA.

On the other hand, in the period 60b, the amplification unit switching signal 40 becomes low, whereupon the input switch unit 15 and the output switch unit 20 of the amplification unit 1 are both changed over to the (B) side (this will be referred to as the "reverse biased side"). In this state, the current sensing resistor terminal voltages 5 and 6 are provided as the negative (−)-side input signal 4 and the positive (+)-side input signal 3 and are introduced to the negative (−) and positive (+) input terminals of the amplification circuit 2, respectively. As in the above case, the amplification circuit 2 multiplies the input signals by the predetermined gain and outputs the positive gain output 18 (gain: GA) and the negative gain output 19 (gain: −GA). Because the output switch unit 20 is also changed over to the (B) side, the negative gain output 19 is outputted as the amplification unit output voltage 12 and is inputted to the CPU 50. At this time, on an assumption that the current sensing resistor terminal voltage is expressed by 62 and the input offset voltage 16 of the amplification circuit 2 is given by +Vofs, the voltage inputted to the amplification circuit 2 is expressed by—(62−Vofs). Accordingly, the negative gain output 19 of the amplification circuit 2 is given by (−62+Vofs)×(−GA).

The various components of the amplification unit output voltages are expressed by 63-66 in a column of the amplification unit output voltage 12 shown in FIG. 2. More specifically, in the cycle 60a, the amplification unit output voltage 12 is given as the sum of 64=input voltage 61×GA and 63=Vofs×GA, which is obtained by multiplying the input offset voltage Vofs by the gain. Similarly, in the cycle 60b, the amplification circuit output voltage 12 is given as the sum of 66=input voltage 62×GA and 65=Vofs×GA, which is obtained by multiplying the input offset voltage Vofs by the gain.

The amplification unit output voltage 12 is sampled at the CPU sampling timing 69, whereby respective sampling values in the cycles 60a and 60b are obtained as 67a and 67b. By computing an average value of the sampling values in the CPU 50 in accordance with a flowchart shown in FIG. 3, the average voltage 68 is obtained as follows:

average voltage 68=(67a+67b)/2 average voltage 68=((61×*GA*+*Vofs*×*GA*)+(62×*GA*−*Vofs*×*GA*))/2 average voltage 68=(61×*GA*+62×*GA*)/2

Thus, the average voltage 68 includes no input offset component of the amplification circuit 2 and is expressed by a value obtained by multiplying the voltages at the opposite terminals of the current sensing resistor by the predetermined gain GA. Accordingly, the current detection can be performed with high accuracy without causing an error attributable to the input offset.

Figure 3:
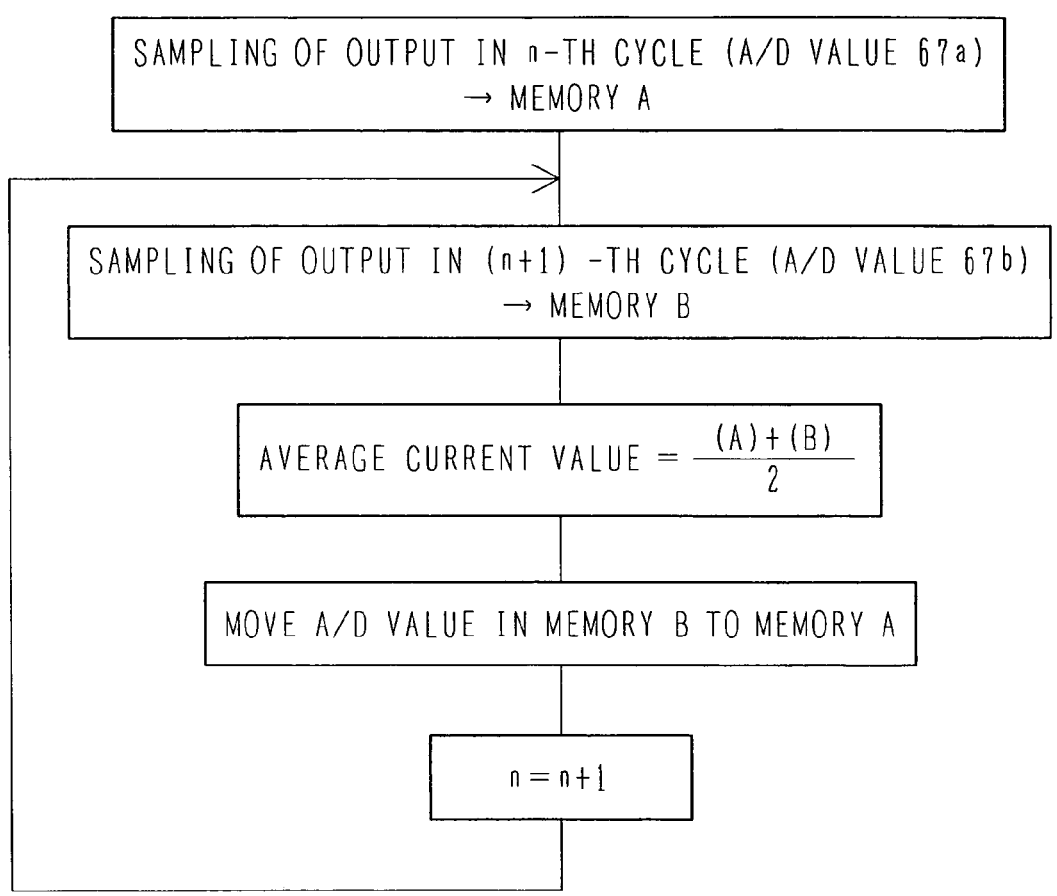
FIG. 3 is a flowchart for explaining an example of the computing operation in a CPU shown in FIG. 1.

FIG. 3 shows one example of the flowchart for computing the average voltage in the CPU 50. With the computing operation described above, the average voltage value is computed per PWM cycle and the detected voltage value is updated. It is therefore possible to detect the driving current flowing to the motor 17 with high accuracy and to perform the motor driving control with high accuracy.

While the first embodiment has been described in connection with the electrical power steering system, the current detection can be similarly performed with high accuracy in an electrically-operated braking system, etc. which employs the three-phase DC motor and the current sensing resistor in the same manner.

Figure 15:
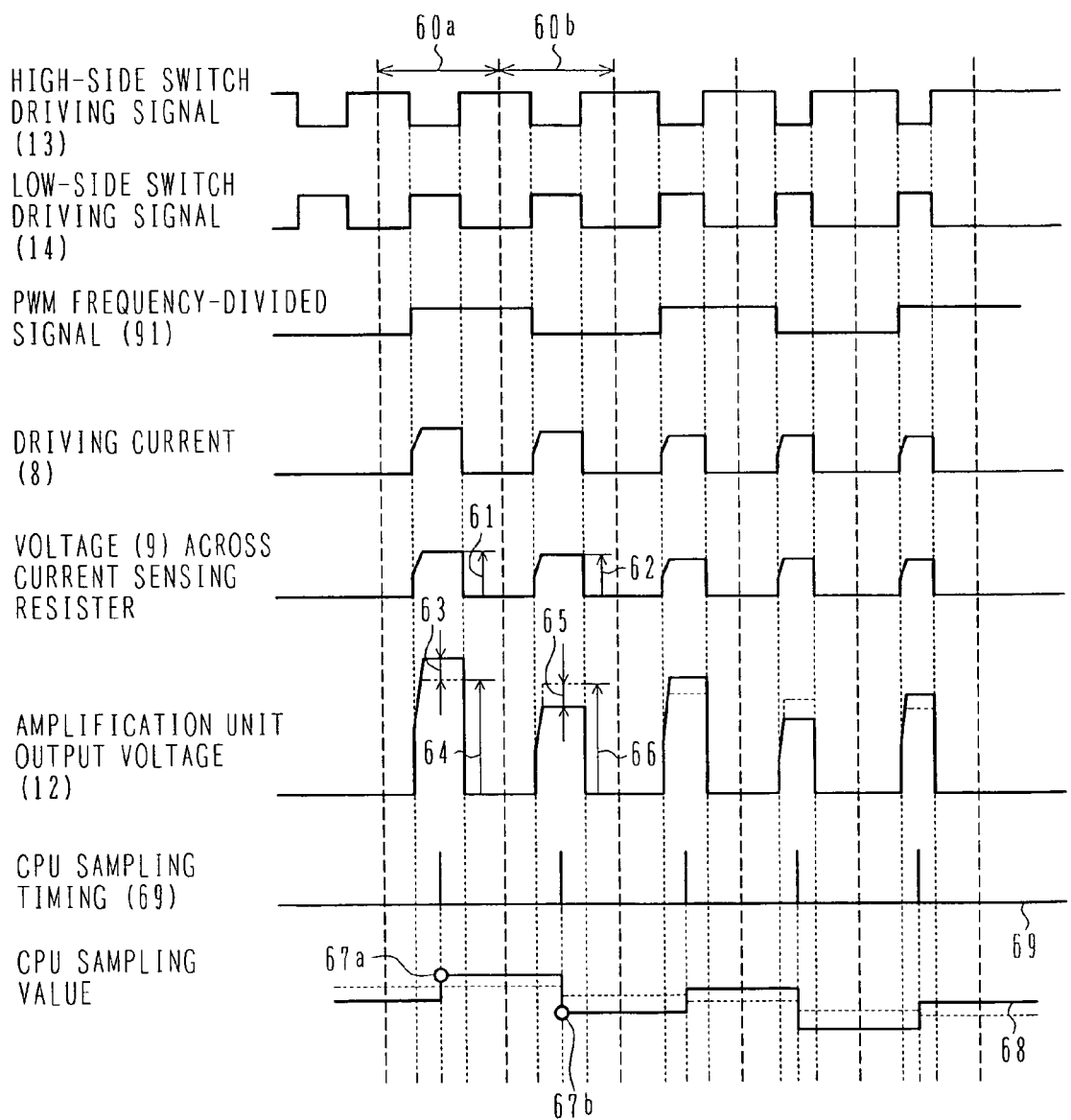
FIG. 15 is a timing chart for explaining another advantage of a similar circuit arrangement to that of the first embodiment shown in FIG. 1.

Another advantage of this first embodiment will be described below with reference to a timing chart of FIG. 15.

In order to supply the driving current to the motor 17, the driving switch circuit 10 is turned on/off in accordance with the high-side switch driving signal 13 and the low-side switch driving signal 14. At this time, the PWM frequency division unit 90 divides the frequency of the high-side switch driving signal 13 and outputs the PWM frequency divided signal 91. As in the above-described first embodiment, the input switch unit 15 and the output switch unit 20 of the amplification unit 1 are each changed over in accordance with the PWM frequency divided signal 91 so that the respective signals in the forward biased side and the reverse biased side are outputted. The CPU 50 performs sampling of the amplification unit output voltage 12 and detects the average voltage.

With the above operation, even in the case of using a CPU which has a limitation in function or speed and cannot output the amplification unit switching signal 40 for switching over amplification unit 1 in sync with the PWM cycle, the current detection free from the offset error can be performed by alternately switching over the amplification unit 1 to the forward biased side and the reverse biased side in accordance with the high-side switch driving signal 13 in sync with the PWM driving cycle of the motor.

While the above description has been made as using the frequency divided signal of the high-side switch driving signal 13 to switch over the amplification unit 1, the similar advantage can also be obtained by using the low-side switch driving signal 14.

Second Embodiment

Figure 4:
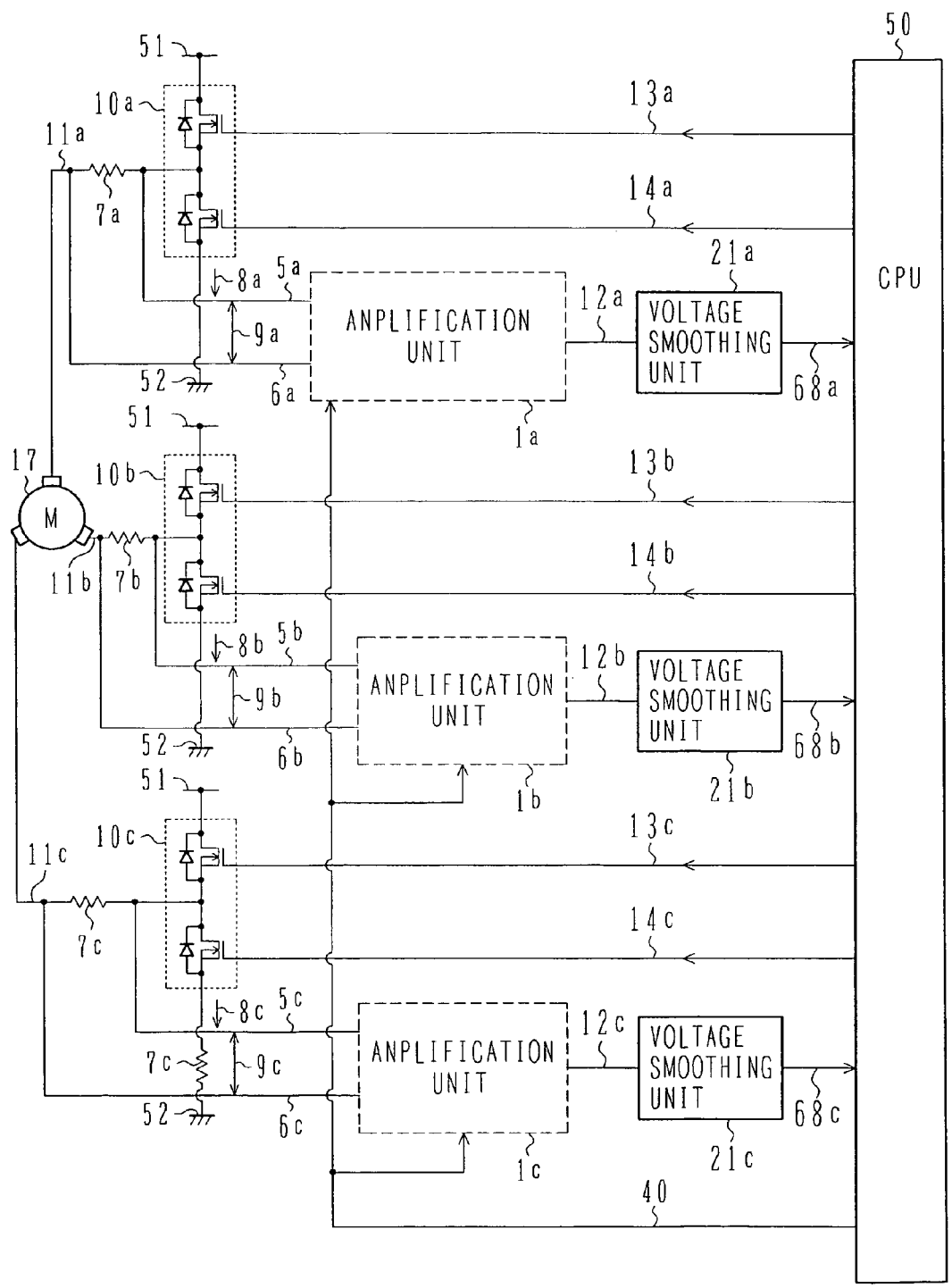
FIG. 4 is a circuit block diagram for explaining a second embodiment of the present invention.

FIG. 4 is a circuit block diagram showing a motor driving current sensing circuit according to a second embodiment of the present invention. In the following description of the second embodiment, a description of the same components as those in the first embodiment is omitted.

In FIG. 4, reference numeral 21 denotes a voltage smoothing unit for smoothing the amplification unit output voltage 12 outputted from the amplification unit 1, and 68 denotes an average voltage. Further, a current sensing resistor (shunt resistance) 7 is disposed between the high-side switch and the low-side switch of the driving switch circuit 10, and voltages at opposite terminals of the current sensing resistor 7 are inputted to the amplification unit 1.

The operation of this second embodiment will be described below with reference to FIG. 5.

Figure 5:
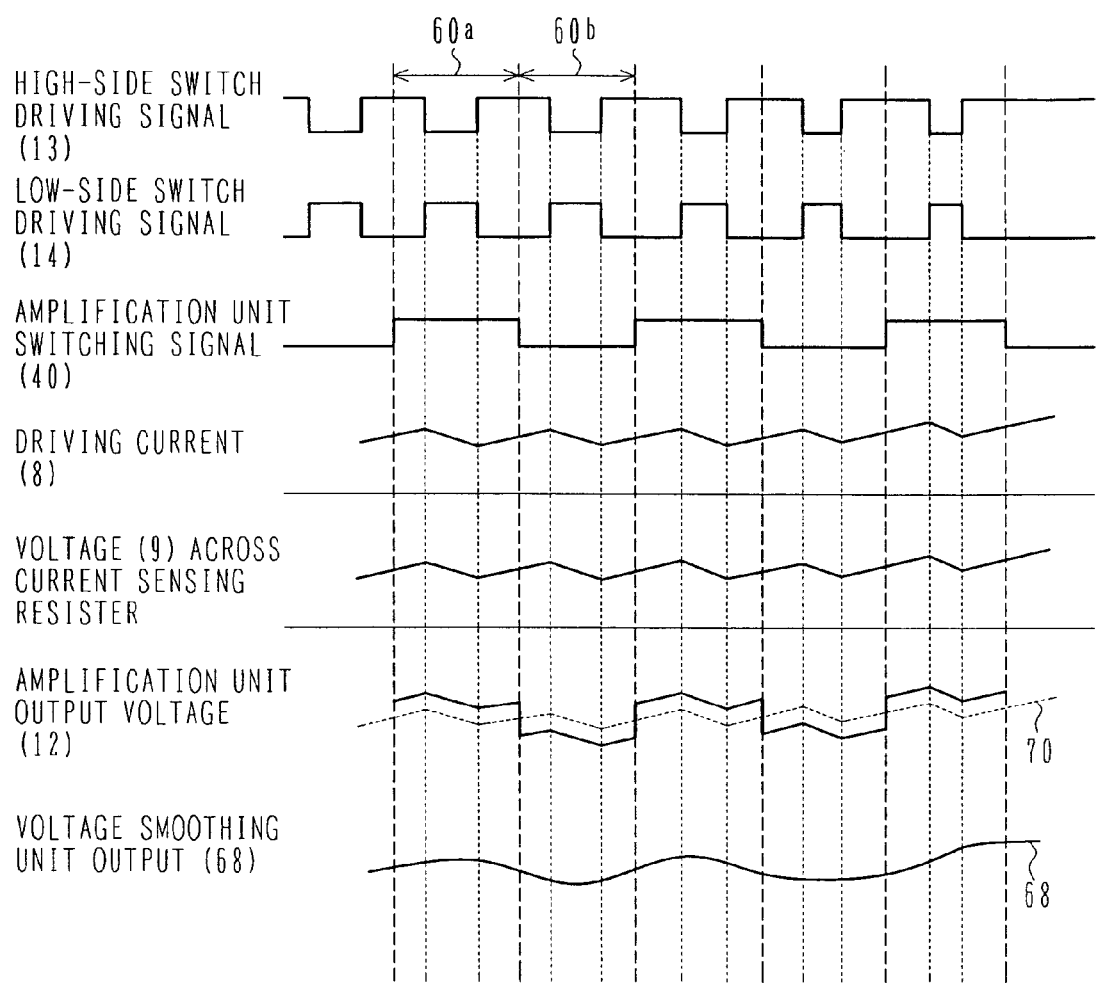
FIG. 5 is a timing chart for explaining the operation of the second embodiment.

As shown in FIG. 5, when the driving current for driving the motor 17 is supplied by turning on/off the driving switch circuit 10 in accordance with the high-side switch driving signal 13 and the low-side switch driving signal 14, the driving current 8 flows through the current sensing resistor 7 and a waveform indicated by a voltage 9 across the current sensing resistor is detected between the opposite terminals of the current sensing resistor 7. When the voltage 9 is inputted to the amplification unit 1 and the input and output signals of the amplification unit 1 are each changed over in accordance with the amplification unit switching signal 40, the amplification unit 1 outputs the amplification unit output voltage 12 shown in FIG. 5. In the same manner as that described above in connection with the first embodiment, the amplification unit output voltage 12 is produced such that a value resulting by multiplying the input offset voltage Vofs of the amplification circuit 2 by the predetermined gain is added to and subtracted from an output voltage 70 corresponding to just the original driving current in the forward biased side and the reverse biased side per PWM cycle, respectively. Then, a resulting signal is inputted to the voltage smoothing unit 21.

Figure 6:
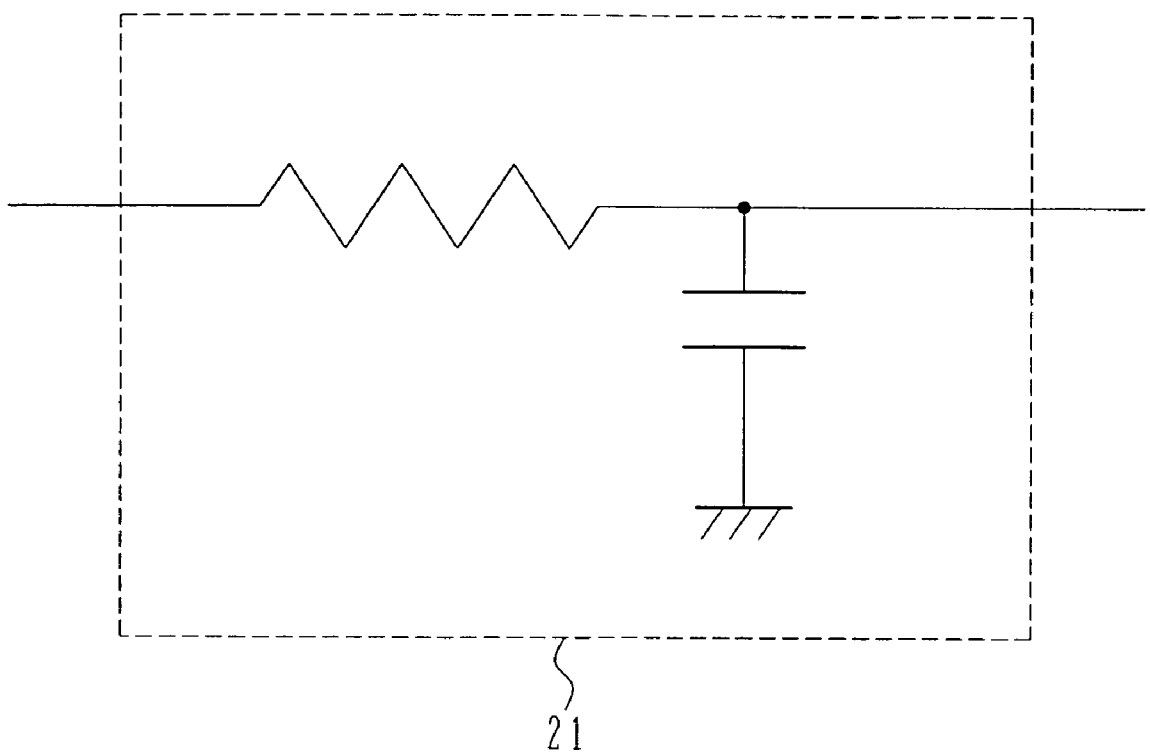
FIG. 6 is a circuit diagram showing one example of a voltage smoothing unit in the second embodiment.

The voltage smoothing unit 21 is constituted, for example, by a low-pass filter (LPF) made up of a resistor and a capacitor, as shown in FIG. 6, which smoothens the amplification unit output voltage 12 and outputs the average voltage 68. The CPU 50 performs A/D conversion and sampling of a signal representing the average voltage 68, thereby detecting the driving current of the motor 17. In this second embodiment, since the average voltage value is obtained by the voltage smoothing unit outside the CPU 50, the computing process in the CPU as represented by the flowchart of FIG. 3 is no longer required. This results in an advantage that the present invention can also be applied to a circuit employing a CPU with a comparatively poor processing capability.

Third Embodiment

Figure 7:
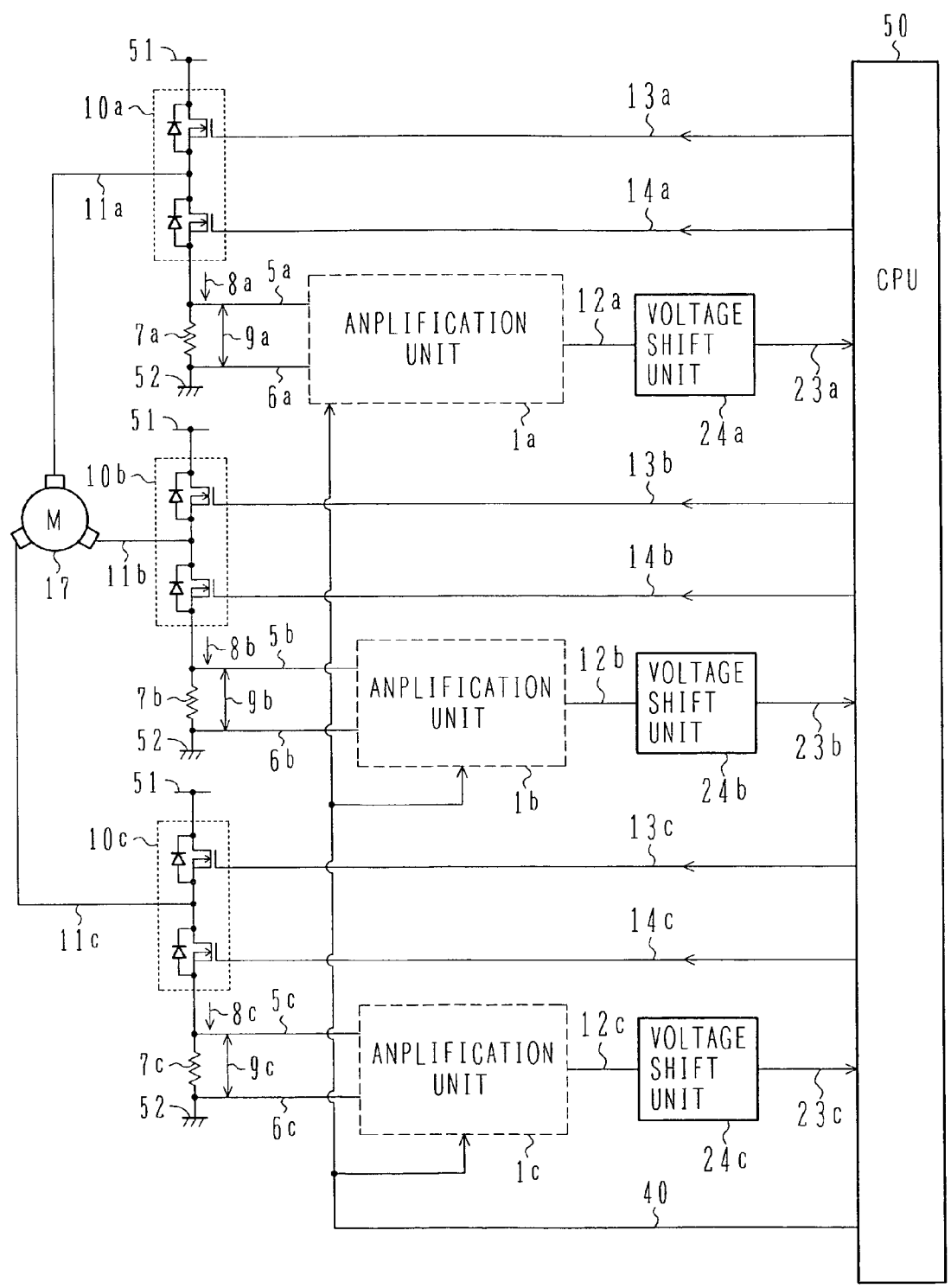
FIG. 7 is a circuit block diagram for explaining a third embodiment of the present invention.

FIG. 7 is a circuit block diagram showing a motor driving current sensing circuit according to a third embodiment of the present invention. A description of the same components as those in the foregoing embodiments is omitted here. In FIG. 7, reference numeral 24 denotes a voltage shift unit disposed between the amplification unit 1 and the CPU 50 to receive the amplification unit output voltage 12.

Figure 8:
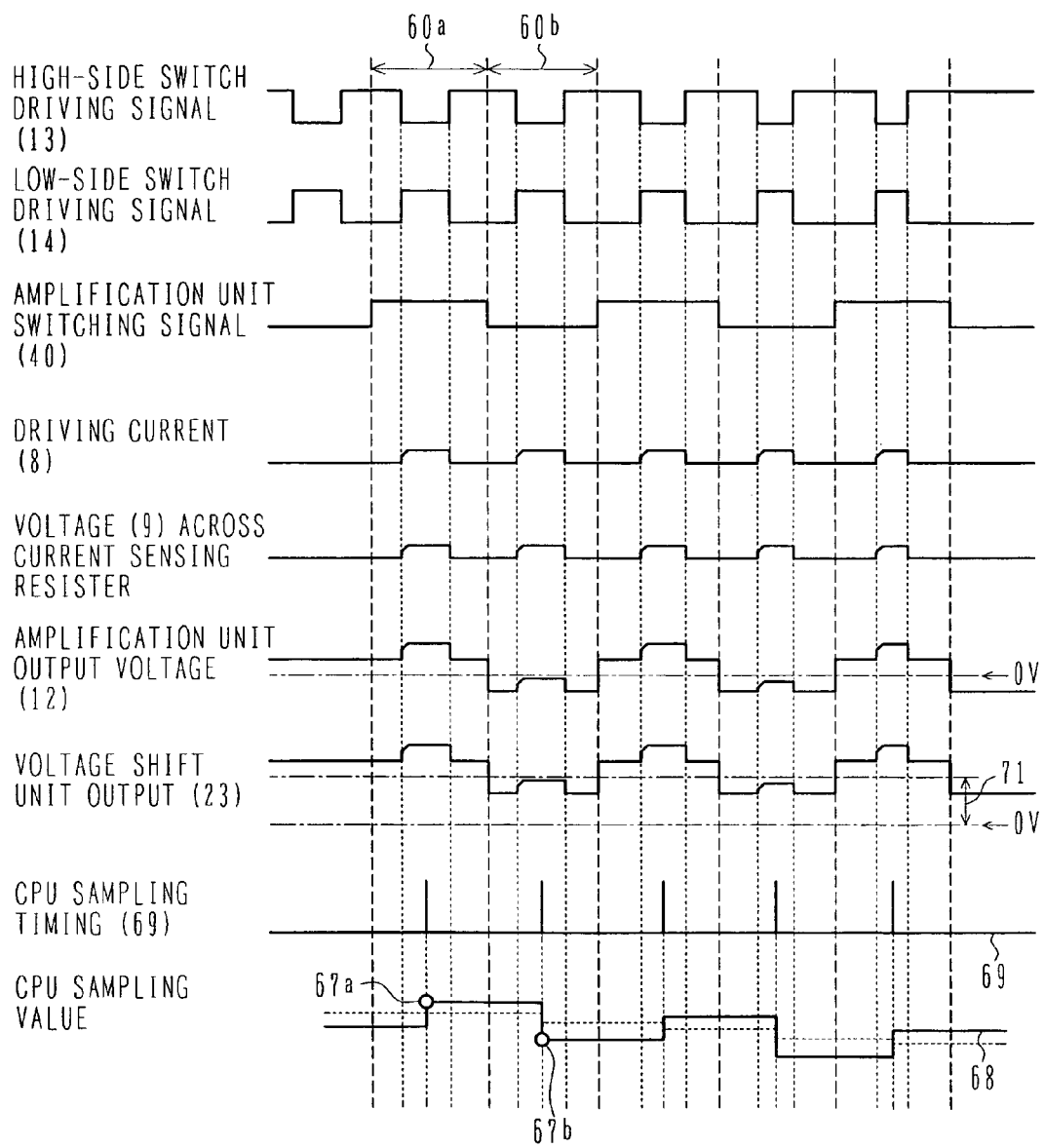
FIG. 8 is a timing chart for explaining the operation of the third embodiment.

FIG. 8 is a timing chart showing the operation of the motor driving current sensing circuit according to the third embodiment.

When the motor driving current is supplied by turning on/off the driving switch circuit 10 in accordance with the high-side switch driving signal 13 and the low-side switch driving signal 14, the driving current 8 flows through the current sensing resistor 7 and a waveform indicated by a voltage 9 across the current sensing resistor is detected between the opposite terminals of the current sensing resistor 7. When the voltage 9 is very small and has a level lower than the input offset voltage Vofs 16 of the amplification circuit 2, the signal outputted from the amplification unit 1 becomes lower than 0 V in some cases, as indicated by 12 in FIG. 8.

Because a voltage range within which the CPU 50 is able to perform sampling is higher than 0 V, normal sampling of a current value cannot be performed in such a case. To avoid such a drawback, the amplification unit output voltage 12 is inputted to the voltage shift unit 24 to boost the voltage 12 by a predetermined voltage 71 so that a voltage shift unit output 23 is outputted after a voltage shift. With that voltage shift, the voltage inputted to the CPU 50 is always boosted to a level higher than 0 V such that, even when the supplied current is very small and the amplification circuit output voltage is lower than 0 V in the reverse biased side, the signal inputted to the CPU 50 can be held higher than 0 V. As a result, it is possible to detect even a very small current value and to perform control of the motor driving current in a normal manner.

Figure 9:
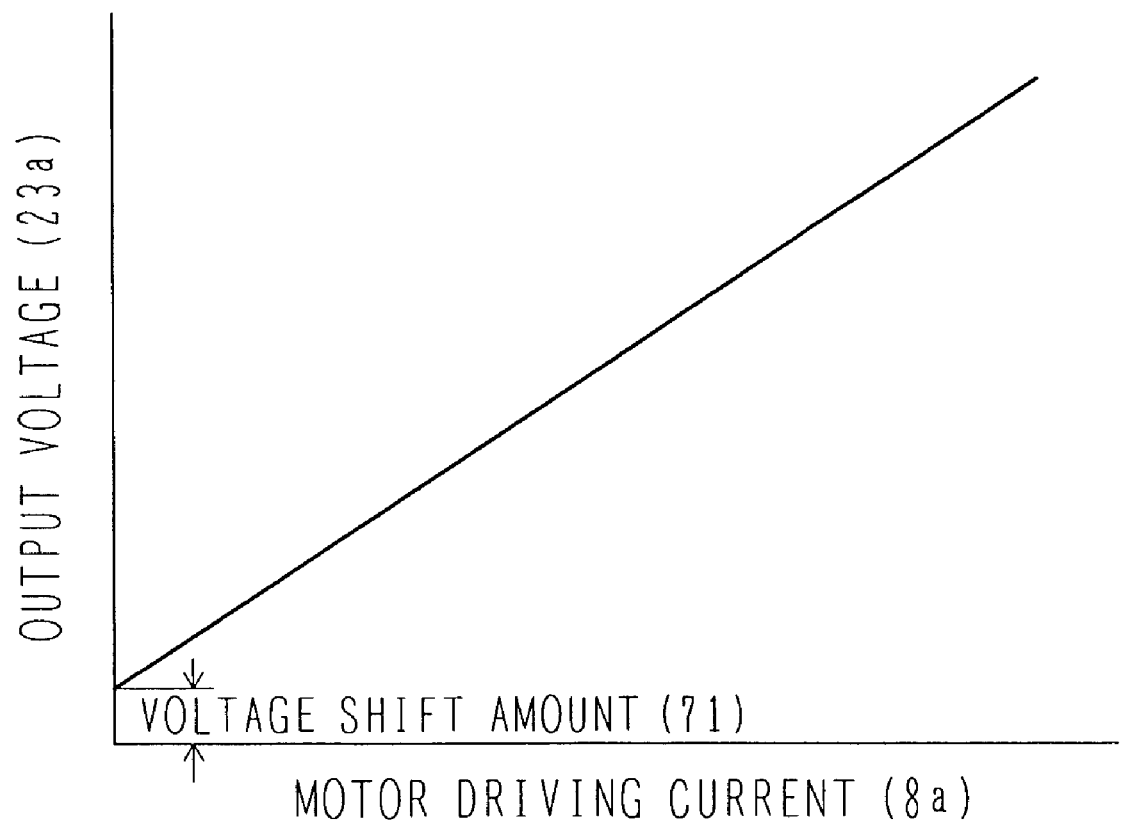
FIG. 9 is a current-voltage characteristic graph for explaining the advantage of the third embodiment.

FIG. 9 is a graph showing the relationship between the motor driving current 8 and the voltage shift unit output 23 in the third embodiment.

The relationship between the motor driving current 8 and the voltage shift unit output 23 is represented by a linear line ascending toward the right such that the output voltage 23 is increased and decreased proportionally as the motor driving current 8 is increased and decreased. When the motor driving current 8 is, e.g., 0, the amplification unit output voltage also becomes 0. For example, if a potential difference exists between the GND 52, to which are connected the motor 17 and the current sensing resistor 7, and the GND to which is connected the CPU 50, there is a fear that the output voltage of the amplification unit 1 becomes 0 before the motor driving current 8 is completely reduced to 0, and a small current cannot be normally detected.

According to this third embodiment, since the voltage shift unit 24 always boosts the amplification unit output voltage inputted to the CPU by a predetermined amount of the shift voltage 71, the predetermined amount of the shift voltage 71 is maintained even when the motor driving current 8 is completely reduced to 0. Therefore, the CPU is able to perform the A/D conversion in a normal manner and to detect the driving current with high accuracy.

Fourth Embodiment

Figure 12:
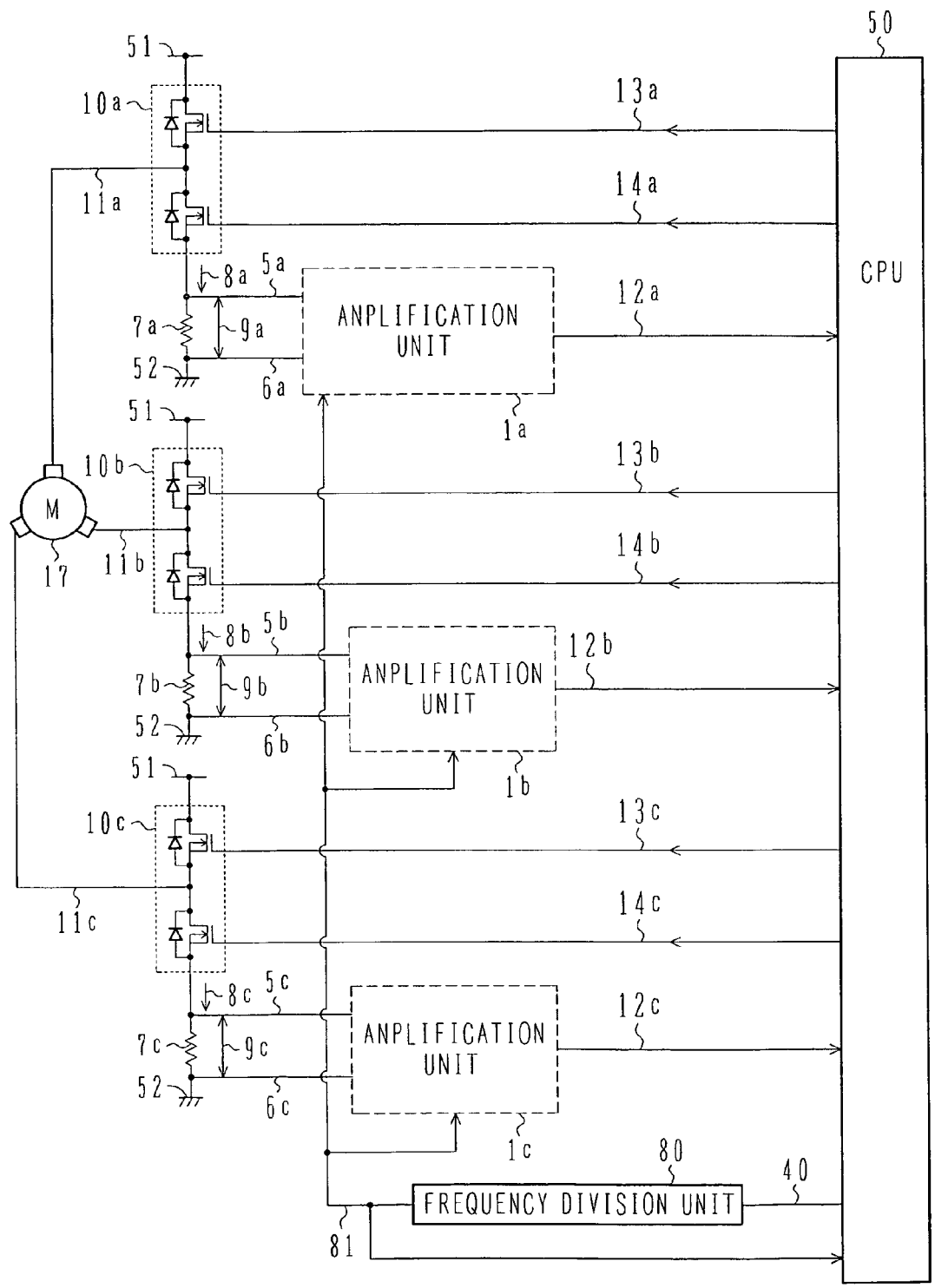
FIG. 12 is a circuit block diagram for explaining a fourth embodiment of the present invention.

FIG. 12 is a circuit block diagram for explaining a fourth embodiment of the present invention, the diagram showing one example of a motor driving current sensing circuit according to the fourth embodiment. A description of the same components as those in the foregoing embodiments is omitted here.

In FIG. 12, reference numeral 80 denotes a frequency division unit for dividing the frequency of the amplification unit switching signal 40 inputted from the CPU and outputting a frequency-divided amplification unit switching signal 81 which is inputted to the amplification unit 1. The frequency-divided amplification unit switching signal 81 is also inputted to the CPU at the same time.

The operation of this fourth embodiment will be described below with reference to FIGS. 13 and 14.

Figure 13:
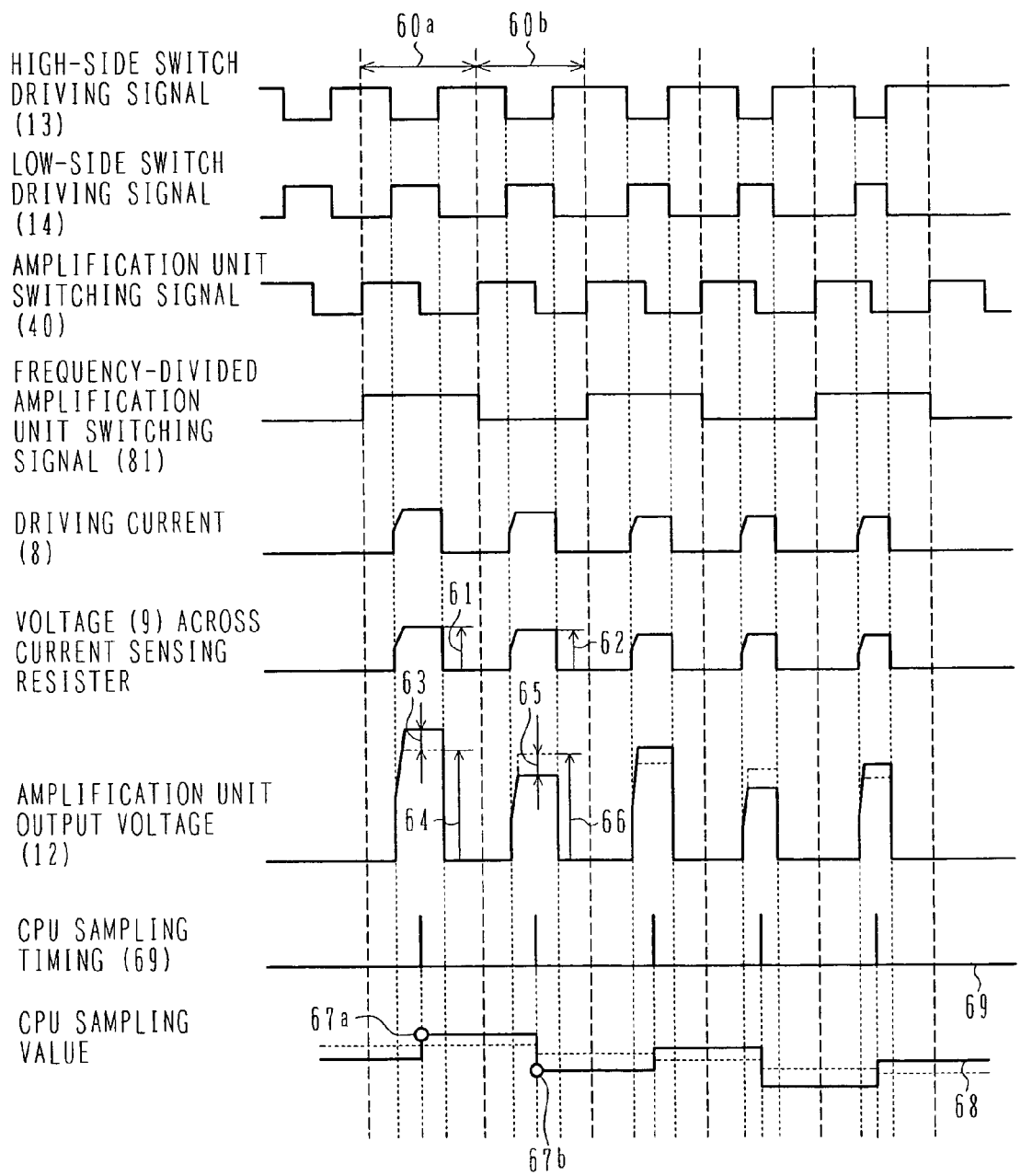
FIG. 13 is a timing chart for explaining the operation of the fourth embodiment.

In some CPU or software, the reverse timing of the amplification unit switching signal 40 is set such that it is reversed at a half cycle of the PWM cycle, as shown in a timing chart of FIG. 13. In such a case, the frequency of the amplification unit switching signal 40 is divided by the frequency division unit 80 to produce the frequency-divided amplification unit switching signal 81. By switching over the amplification unit 1 in accordance with the signal 81, the amplification unit output voltage can be alternately forward biased and reverse biased per PWM cycle so that the average voltage can be detected.

Figure 14:
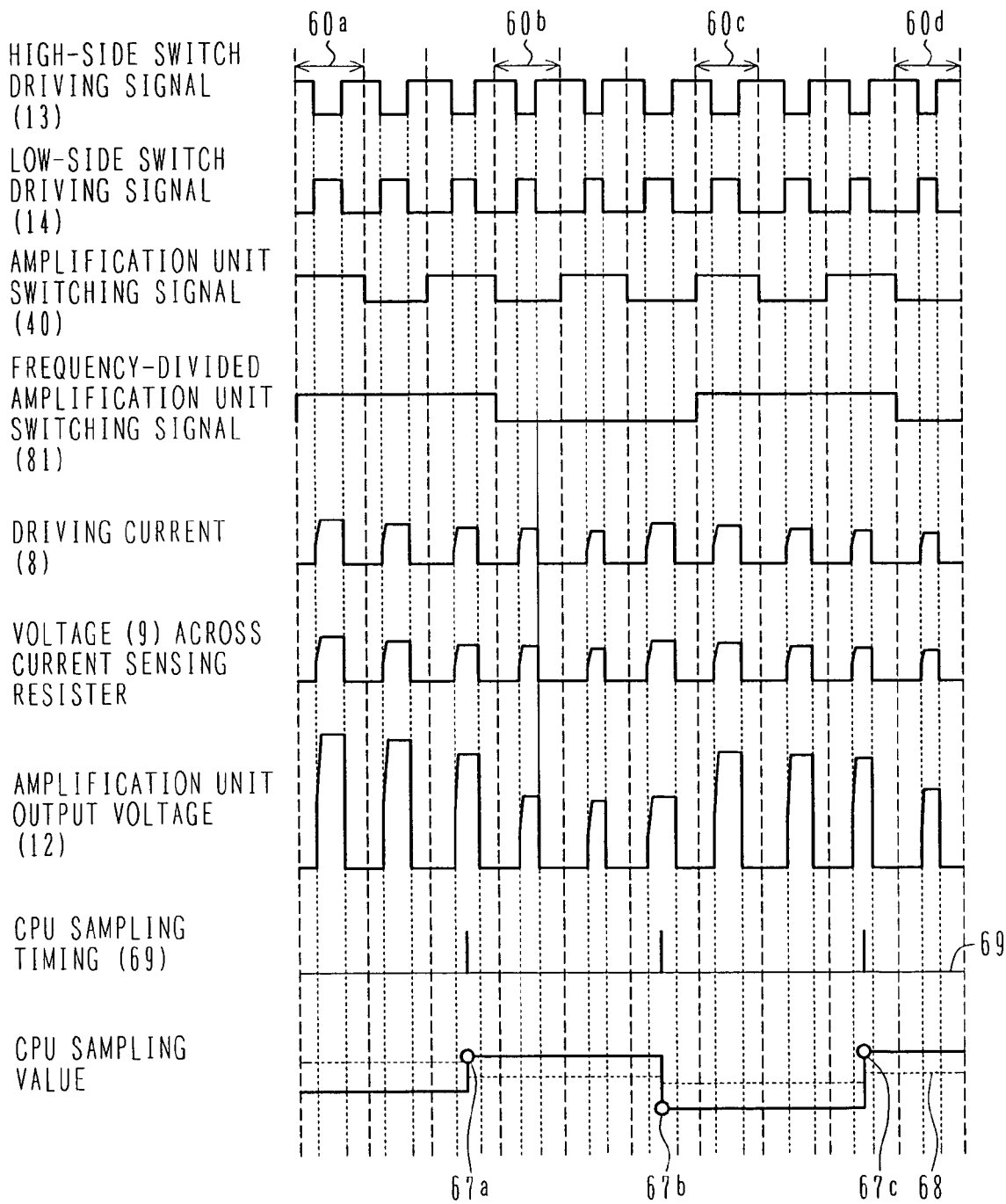
FIG. 14 is a timing chart for explaining the operation of the fourth embodiment, which provides another advantage.

FIG. 14 is a timing chart for explaining the operation of the fourth embodiment, which provides another advantage. The frequency division unit 80 divides the frequency of the amplification unit switching signal 40, which is inputted from the CPU, by three to produce a frequency-divided amplification unit switching signal 81. The amplification unit 1 is switched over in accordance with the signal 81.

Simultaneously, the frequency-divided amplification unit switching signal 81 is inputted to the CPU 50 as well. Therefore, the CPU 50 can generate a sampling timing pulse 69 at the timing in sync with the frequency-divided amplification unit switching signal 81 to perform sampling of the amplification unit output voltage. As a result, the CPU sampling can be performed while a sufficient time is left after the switching-over of the amplification unit 1. Thus, by sampling the amplification unit output voltage once in an odd number (three) of PWM cycles, the average voltage can be obtained in a normal manner. Another advantage is that the sampling can be made without suffering from an influence of noise, etc. caused with the switching operation.

Fifth Embodiment

Figure 16:
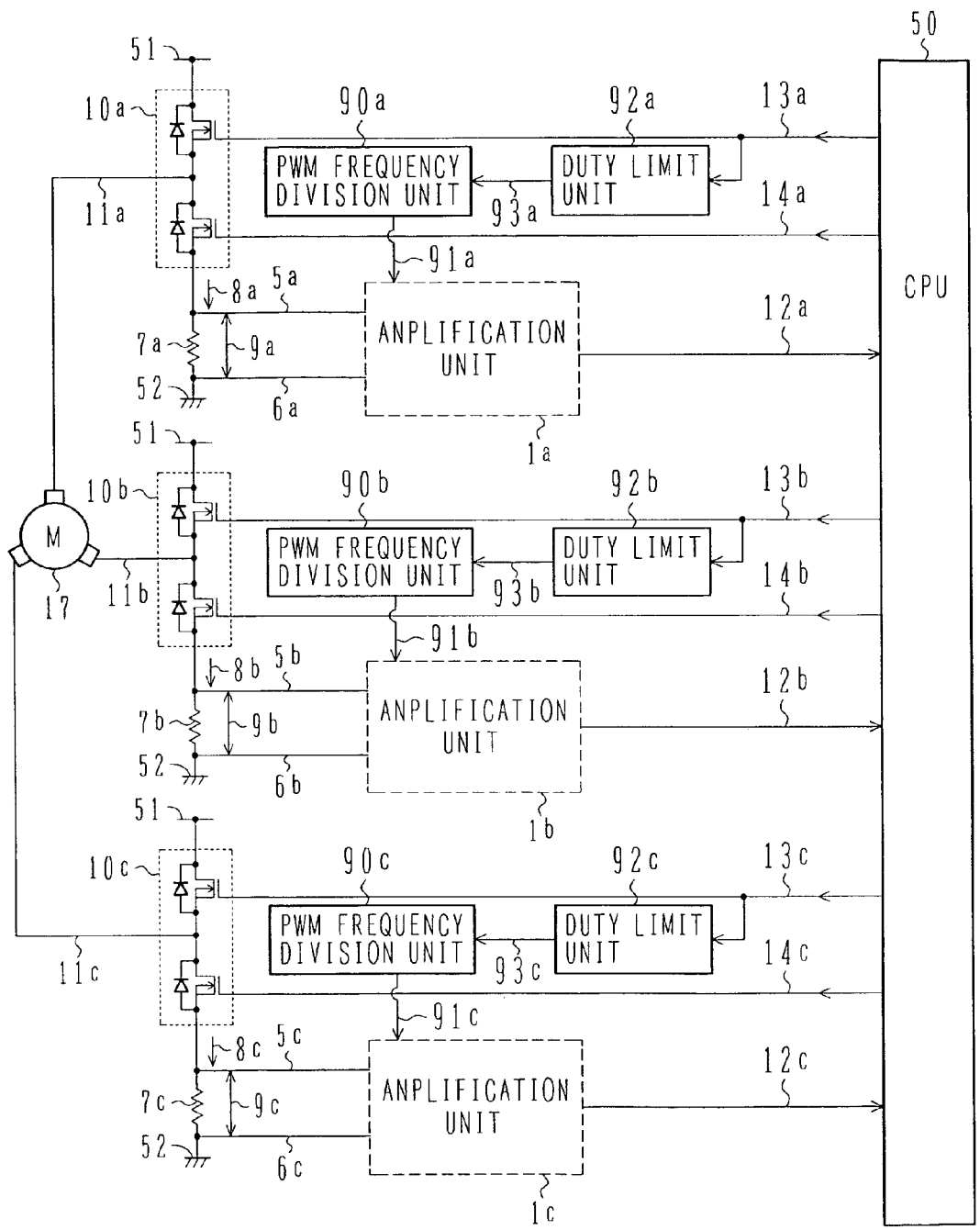
FIG. 16 is a circuit block diagram for explaining a fifth embodiment of the present invention.

FIG. 16 is a circuit block diagram for explaining a fifth embodiment of the present invention, the diagram showing one example of a motor driving current sensing circuit according to the fifth embodiment. A description of the same components as those in the foregoing embodiments is omitted here.

In FIG. 16, reference numeral 92 denotes a duty limit unit, and 93 denotes a duty limit unit output signal. The high-side switch driving signal 13 is inputted to the duty limit unit 92, and the duty limit unit output signal 93 is inputted to a frequency division unit 90.

The operation of this fifth embodiment will be described below with reference to FIGS. 17 and 18.

Figure 17:
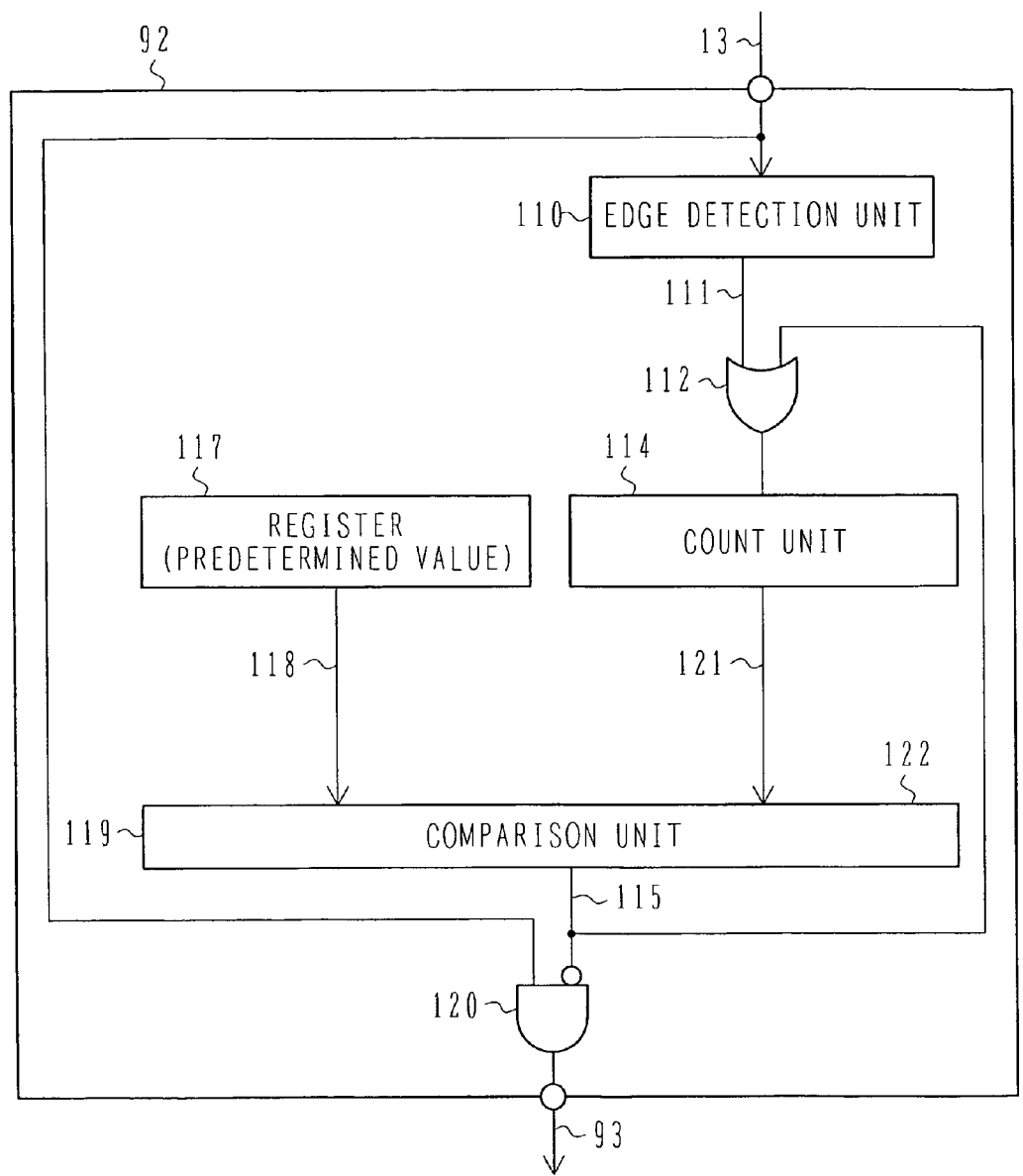
FIG. 17 is a block diagram for explaining the configuration of a duty limit unit in the fifth embodiment.

FIG. 17 is a block diagram showing the internal configuration of the duty limit unit 92. In FIG. 17, reference numeral 110 denotes an edge detection unit for detecting the edge of an input signal, 111 denotes an edge signal, and 112 denotes an OR circuit. Reference numeral 114 denotes a count unit (circuit) which is reset by a reset signal 113 outputted from the OR circuit 112. Reference numeral 117 denotes a register for holding a predetermined value. The predetermined value held in the register 117 is variable depending on the PWM cycle 60.

A setting value output 118 and a count unit output 121 are compared with each other by a comparison unit 119 so that a comparison unit output 115 is issued at a predetermined count value. The comparison unit output 115 is used to reset the count unit 114 through the OR circuit 112. At the same time, the logical product (AND) of the comparison unit output 115 and the inputted high-side switch driving signal 13 are obtained in an AND circuit 120 which outputs the duty limit unit output signal 93.

The operation of the fifth embodiment will be described below with reference to a timing chart of FIG. 18.

When the edge of the inputted high-side switch driving signal 13 is detected, the count unit 114 operating at a predetermined clock is reset. Thus, the count unit output 121 is reset and returned to a value of 0 each time the edge signal 111 is inputted. Except for the case of a duty ratio being 0% and 100%, because a PWM signal is inputted once per the PWM cycle 60, it is possible to produce the PWM frequency divided signal 91, which is reversed per the PWM cycle, by dividing the frequency of the PWM signal, and to perform the current detection.

When the duty ratio is 0% or 100%, the PWM signal is not inputted in the relevant PWM cycle. Therefore, the count unit 114 is not reset by the edge signal 111 and the count value continues to increase. When the value of the setting value output 118 set by the register 117 is matched with the value of the count unit output 121, the comparison unit output 115 is outputted from the comparison unit 119 and is inputted to the division unit 90, thus enabling the frequency division signal 91 to be produced. Accordingly, even when the duty ratio of the PWM signal is 0% or 100%, the frequency divided signal can be reversed in the relevant PWM cycle so as to produce PWM frequency divided signal 91 that is reversed per the PWM cycle. It is hence possible to reverse the input and output switch units of the amplification circuit per the PWM cycle and to accurately perform the current detection.

While the high-side switch driving signal 13 is inputted to the duty limit unit 92 in the above-described fifth embodiment, the similar advantage can also be obtained by inputting the low-side switch driving signal 14 to the duty limit unit 92.

Sixth Embodiment

Figure 10:
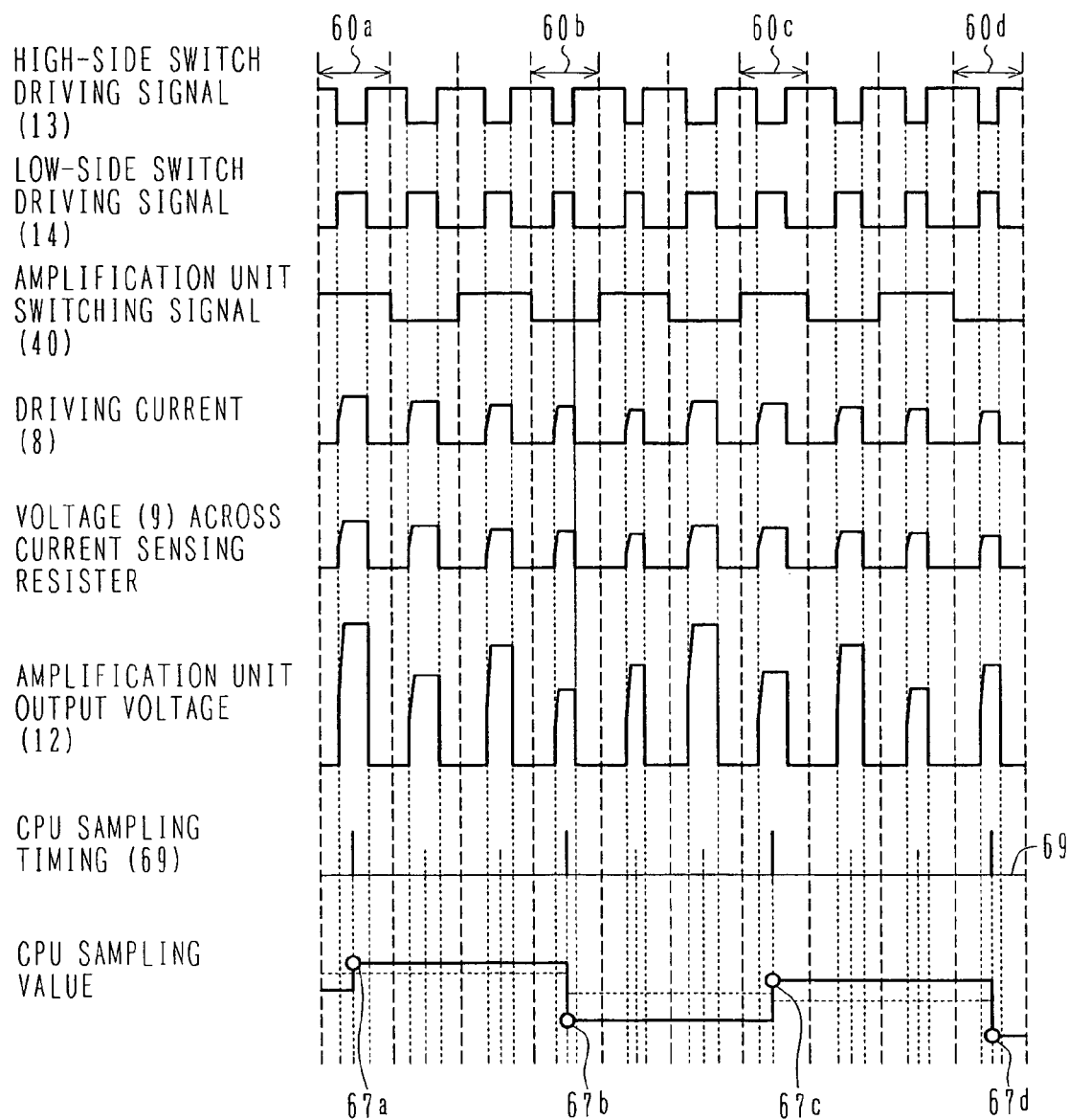
FIG. 10 is a timing chart for explaining a modification having a similar circuit arrangement to that of the first embodiment shown in FIG. 1.
Figure 11:
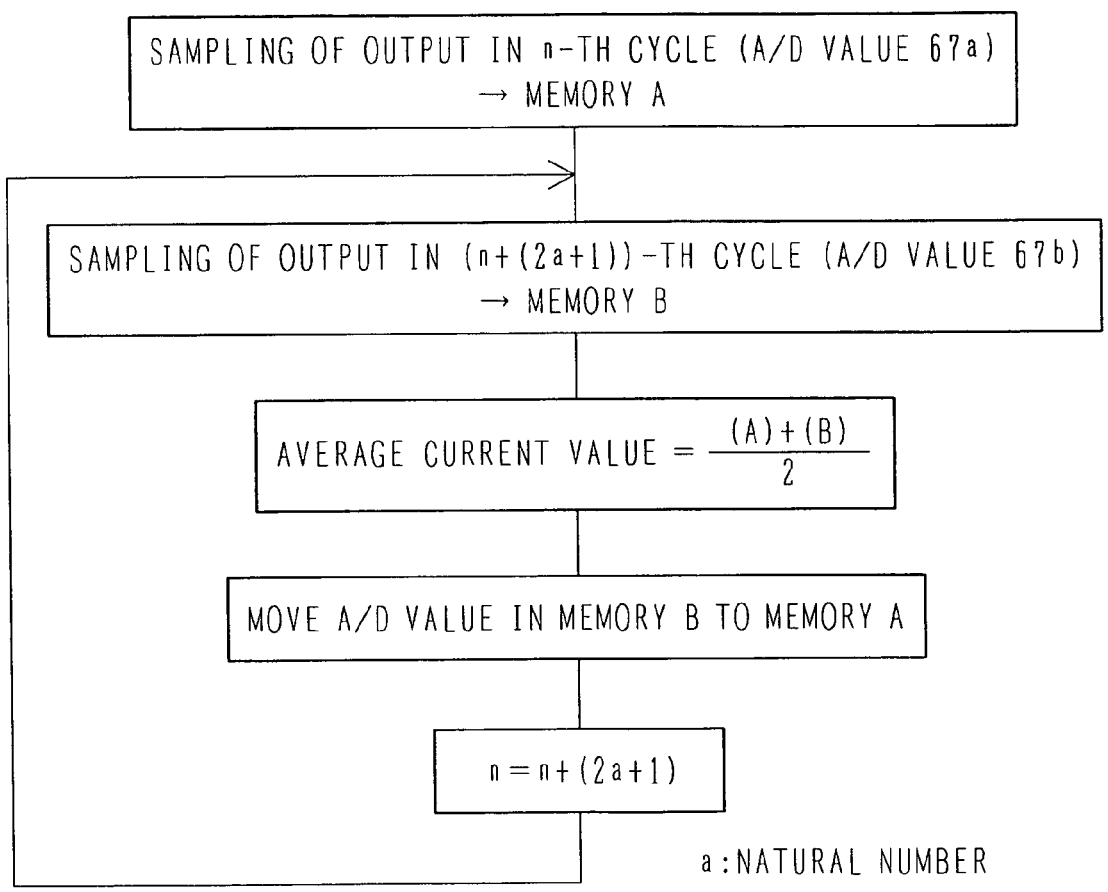
FIG. 11 is a flowchart for explaining the modification having the similar circuit arrangement to that of the first embodiment shown in FIG. 1.

FIGS. 10 and 11 are respectively a timing chart and a flowchart for explaining a modification having a similar circuit arrangement to that of the first embodiment.

In FIG. 10, when the motor driving current is supplied by turning on/off the driving switch circuit 10 in accordance with the high-side switch driving signal 13 and the low-side switch driving signal 14, the driving current 8 flows through the current sensing resistor 7 and a waveform indicated by a voltage 9 across the current sensing resistor is detected between the opposite terminals of the current sensing resistor 7.

When the voltage 9 is inputted to the amplification unit 1 to switch over it in accordance with the amplification unit switching signal 40, the amplification unit 1 outputs a voltage signal in the forward biased side and the reverse biased side, which is changed as indicated by the amplification unit output voltage 12 in FIG. 10. Because the amplification unit switching signal 40 is alternately reversed per the PWM cycle, the amplification unit output voltage 12 is also alternately forward biased and reverse biased in a repeated manner. When the CPU 50 executes sampling in accordance with the flowchart of FIG. 11, the sampling is performed once in each odd PWM cycle and the sampling timing is given as indicated by 69 in FIG. 10. Subsequently, as in the foregoing embodiments, an average voltage can be computed by using sampling data (67a-67d) and motor driving can be controlled based on the computed average data.

Thus, even in the case of the CPU being poor in computing capability and having a difficulty in executing the sampling per the PWM cycle when the amplification unit output voltage is alternately forward biased and reverse biased repeatedly per the PWM cycle, the average voltage can be computed in a normal manner by performing the sampling once in each odd PWM cycle. As a result, the motor driving current can be controlled by detecting an average current based on the computed average voltage.

According to the embodiments described above, the motor driving current can be controlled with high accuracy by using even an operational amplifier having an ordinary input offset. Also, since influences due to external factors such as a temperature variation are avoided, a motor control system free from a torque ripple can be obtained. It is to be noted that the motor control systems described in the foregoing embodiments can be employed in not only the electrical power steering system, but also in other various applications using motors, such as a brake control system and a vehicular driving control system.

What is claimed is:

1. A motor control system comprising:
a switch circuit for supplying a driving current to a motor;
a current sensing circuit for detecting the driving current and converting the detected current to a voltage; and
an amplification circuit for amplifying the voltage converted by said current sensing circuit,
wherein said motor control system further comprises means for compensating an input offset of said amplification circuit,
wherein said amplification circuit comprises input section switch means disposed in an input section of said amplification circuit and output section switch means disposed in an output section of said amplification circuit, and
said input section switch means and said output section switch means are each controlled to be changed over at a predetermined cycle.

2. The motor control system according to claim 1, wherein said motor control system comprises a processing unit for computing the driving current depending on an output of said amplification circuit and outputting a PWM control signal to perform PWM control of rotation of said motor; and
switch changeover means for outputting a switch changeover signal for changing over each of said input section switch means and said output section switch means at the predetermined cycle, and
wherein said switch changeover means outputs the switch changeover signal in sync with the PWM control signal, thereby changing over each of said input section switch means and said output section switch means.

3. The motor control system according to claim 2, wherein said motor control system further comprises frequency division means for dividing frequency of the PWM control signal, and
said input section switch means and said output section switch means are each changed over in accordance with a frequency divided signal obtained through the frequency division made by said frequency division means.

4. The motor control system according to claim 3, wherein the frequency divided signal is inputted to said processing unit, and
said processing unit performs sampling of an output of said amplification circuit at timing in sync with the frequency divided signal.

5. The motor control system according to claim 2, wherein said input section switch means and said output section switch means are each changed over to selectively take a first state or a second state, and
said processing unit averages a first sampling value taken in when said input section switch means and said output section switch means are each in the first state, and a second sampling value taken in when said input section switch means and said output section switch means are each in the second state.

6. The motor control system according to claim 5, wherein said processing unit takes in the first sampling value and thereafter takes in the second sampling value when said input section switch means and said output section switch means are each changed over in an odd number.

7. The motor control system according to claim 1, wherein said switch circuit includes a high-side switch and a low-side switch connected to said high-side switch through a first contact,
said current sensing circuit is disposed between said motor and said first contact, and
said motor control system further comprises voltage smoothing means for smoothing an output voltage of said amplification circuit.

8. The motor control system according to claim 7, wherein said voltage smoothing means is a low-pass filter made up of a resistor and a capacitance.

9. The motor control system according to claim 5, wherein said motor control system further comprises voltage shift means for shifting an output voltage of said amplification circuit.

10. The motor control system according to claim 5, wherein said motor control system further comprises duty limit means for limiting a duty ratio of the PWM control signal, and
said duty limit means outputs the switch changeover signal for changing over each of said input section switch means and said output section switch means when the duty ratio of the PWM control signal is 0% or 100%.

11. A motor control system comprising:
a switch circuit including a high-side switch and a low-side switch and supplying a driving current to a three-phase motor;
a resistor for detecting the driving current;
an amplification circuit for amplifying a potential difference across said resistor;
input section switch means disposed in an input section of said amplification circuit and changing over the potential difference to be forward biased or reverse biased;
output section switch means disposed in an output section of said amplification circuit and changing over an output voltage of said amplification circuit to be forward biased or reverse biased; and
a processing unit for averaging a first output voltage produced when the output voltage of said amplification circuit is forward biased, and a second output voltage produced when the output voltage of said amplification circuit is reverse biased.

12. The motor control system according to claim 11, wherein said motor control system rotates said three-phase motor in accordance with PWM control, and
said input section switch means and said output section switch means are each changed in sync with a PWM control signal.

13. The motor control system according to claim 11, wherein said motor control system further comprises PWM frequency division means,
said PWM frequency division means divides frequency of the PWM control signal and produces a frequency divided signal, and
said input section switch means and said output section switch means are each changed over in accordance with the frequency divided signal.

14. The motor control system according to claim 13, wherein said motor control system further comprises voltage shift means for shifting the output voltage of said amplification circuit.

15. The motor control system according to claim 13, wherein said motor control system further comprises duty limit means for limiting a duty ratio of the PWM control signal, and said duty limit means outputs a switch changeover signal for changing over each of said input section switch means and said output section switch means when the duty ratio of the PWM control signal is 0% or 100%.

* * * * *